US012265475B2

United States Patent
Robinson

(10) Patent No.: US 12,265,475 B2
(45) Date of Patent: Apr. 1, 2025

(54) TRANSLATING VIRTUAL MEMORY ADDRESSES TO PHYSICAL MEMORY ADDRESSES

(71) Applicant: MIPS Tech, LLC, San Jose, CA (US)

(72) Inventor: James Robinson, New York, NY (US)

(73) Assignee: MIPS Tech, LLC, San Jose, CA (US)

( * ) Notice: Subject to any disclaimer, the term of this patent is extended or adjusted under 35 U.S.C. 154(b) by 0 days.

(21) Appl. No.: 17/960,006

(22) Filed: Oct. 4, 2022

(65) Prior Publication Data

US 2024/0111687 A1   Apr. 4, 2024

(51) Int. Cl.
*G06F 12/1027*   (2016.01)

(52) U.S. Cl.
CPC .... *G06F 12/1027* (2013.01); *G06F 2212/681* (2013.01)

(58) Field of Classification Search
None
See application file for complete search history.

(56) References Cited

U.S. PATENT DOCUMENTS

| 2017/0212844 | A1* | 7/2017 | Williams | G06F 3/0611 |
| 2019/0377686 | A1* | 12/2019 | Shirahige | G06F 12/0891 |
| 2022/0188245 | A1* | 6/2022 | Sandberg | G06F 12/1009 |
| 2023/0205709 | A1* | 6/2023 | Parker | G06F 12/1475 |
| | | | | 711/163 |

* cited by examiner

*Primary Examiner* — Stephanie Wu

(57) ABSTRACT

In one embodiment, a method includes accessing a virtual address from a request to access a memory of the computing device, where virtual addresses are translated to physical addresses of physical memory in the computing device using an N-level page table, and the lowest level of the page table contains page-table entries specifying the physical address of a frame of physical memory. The method includes searching, using the virtual address, a translation lookaside buffer (TLB) including a plurality of TLB entries, each TLB entry including (1) a tag identifying a virtual address associated with the entry and (2) a page-table entry specifying the physical address of a lower-level page table or of a frame of physical memory associated with the virtual address identified in the tag; and iteratively performing, until the virtual address is translated to a physical address, an address-translation procedure that depends on the cached TLB entries.

10 Claims, 3 Drawing Sheets

TRANSLATING VIRTUAL MEMORY ADDRESSES TO PHYSICAL MEMORY ADDRESSES

TECHNICAL FIELD

This application generally relates to methods and systems for performing virtual-to-physical memory address translations.

BACKGROUND

When an operating system (OS) system executes a process, such as a program, the process often uses virtual memory, which is accessible using virtual memory addresses. The process's view of memory is of the virtual memory, e.g., a large, contiguous region of available memory, even though the physical memory of the computing device executing the process may be partitioned or have a different size than the virtual memory. In addition, virtual addresses can isolate processes and their memory accesses from each other, and the OS can manage physical memory access, e.g., from multiple processes, more efficiently.

The OS typically establishes translations from virtual addresses to physical addresses associated with physical memory. The OS often carries out such memory translations using a page table, which translates the virtual address of bock (or page) of virtual memory, i.e., a fixed amount of virtual memory such as a 4 kb block of memory, to the address of a corresponding block (or page or frame) of physical memory. In this example, a virtual address may contain two parts: the virtual address of a page of virtual memory, and an offset identify a particular region (e.g., a byte) of memory within the page.

Translations from virtual to physical addresses may use a single-level page table or a multi-level page table. For example, a three, four, or five level page table may be used. For a multi-level page table, the first level is an index, with each entry at that level associated with a pointer to a physical address of table at the next level. This layered approach proceeds until the last level, which contains page-table entries identifying the physical addresses of the frames corresponding to virtual pages. Portions of a virtual address identify the index for each level, as well as the offset within the corresponding memory page.

For example, a 32-bit virtual address for a 2-level page table may contain a 10-bit index for the first level, a 10-bit index for the second level, and a 12-bit offset. In order to translate the virtual address to a physical address, the first level of the page table is accessed. For example, a page-table base register may store a pointer to the physical address of the first-level table entry for the process being executed by the processor. The most significant bits (i.e., the first 10 bits) of the virtual address are used to find the appropriate index in the first-level table. This index is associated with, e.g., a pointer to the physical address of the appropriate second-level table. This second-level table is accessed, and the next 10 bits of the virtual address are used to find the appropriate index in this second-level table. The index in the second-level table is associated with a page-table entry that identifies the physical address of the page being sought. The exact memory location referenced in the virtual address can then be obtained using the page-table entry of the second-level table and the offset specified in the virtual address.

A translation lookaside buffer (TLB) is a cache that stores a limited number of recent translations from the virtual address of a page to that page's corresponding physical address. Therefore, if a virtual address needs to be translated, the TLB can first be checked to see whether a translation already exists in a TLB, without having to traverse (i.e., walk) the page table to find the correct translation.

To perform a table walk, a high-performance CPU may use a hardware table walker to find the correct virtual-to-physical address translation and place the translation in the TLB. This hardware table walk operates without software intervention, and so leads to fast execution, but it increases CPU power and area consumption. A relatively lower performance CPU may instead use a software table walker, which finds the correct translation and refills the TLB using a program stored in memory. Since this program utilizes the existing CPU instruction set, a software table walker requires no increase in CPU power and area but gives slower performance.

DESCRIPTION OF EXAMPLE EMBODIMENTS

As explained above, a conventional TLB can store recently used translations between a virtual address and a page-table entry mapping a virtual page to a physical frame in memory. However, when a translation is not found in the TLB, then a page table walk must be performed to determine the virtual-to-physical address translation. When a N-level multi-level page table is used to translate virtual addresses to physical addresses, then a page table walk requires N memory translations. Each memory translation requires multiple instructions to execute, and these instructions can be particular costly in terms of time spent to perform a translation when the table walk is performed by software, which avoids the size, expense, and power consumption required to perform a page table walk in hardware.

Figure 1:
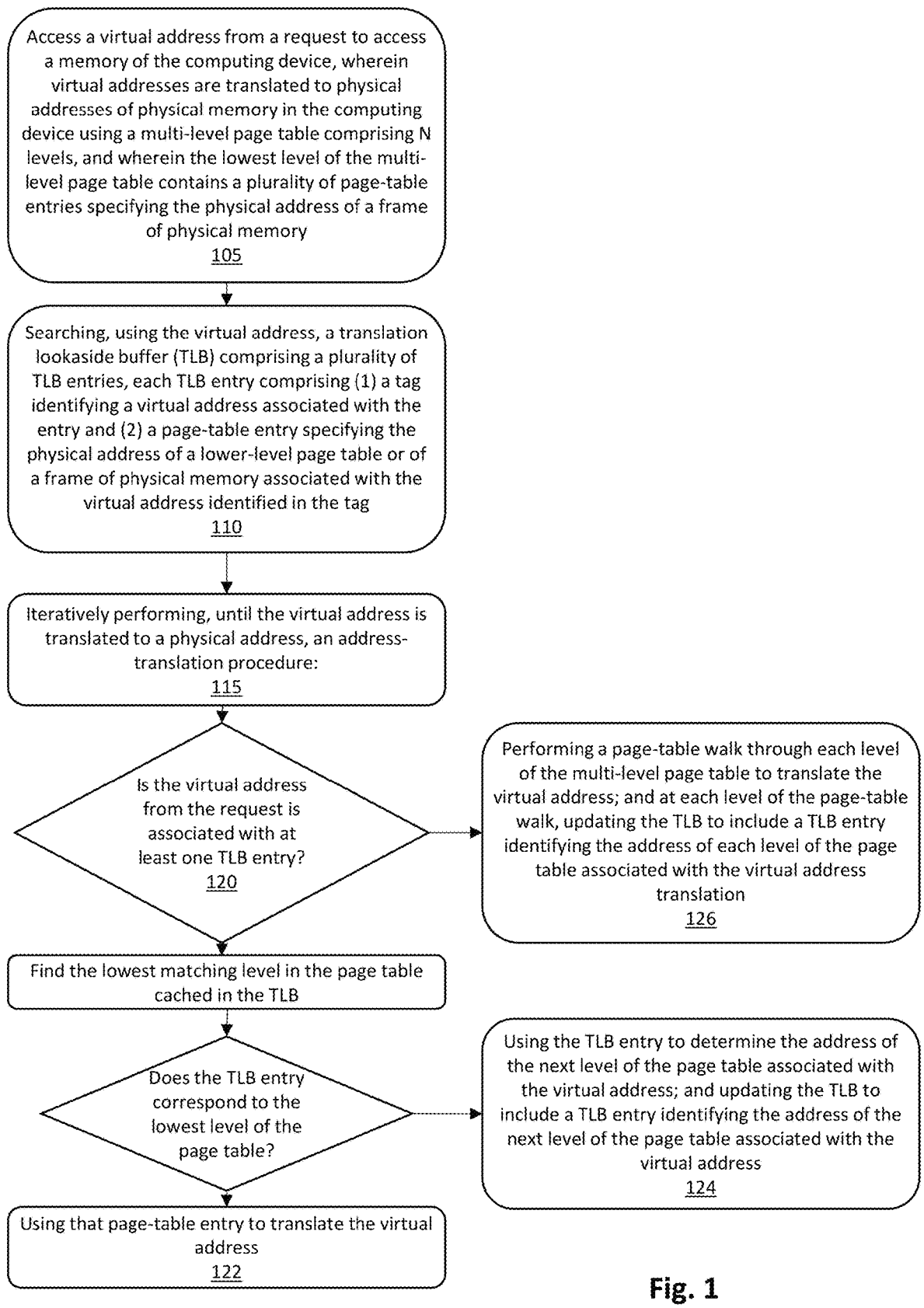
FIG. 1 illustrates an example method for reducing the time spent on page table walks.

FIG. 1 illustrates an example method for reducing the time spent for the vast majority of table walks a system will need to perform. As explained more fully herein, embodiments of this disclosure reduce the need for full page-table walks (i.e., walks through every level of the page table) in order to perform a virtual-to-physical address translation, thereby reducing the resources (time, computing power) required to perform such translations. In addition, as explained more fully herein, embodiments of this disclosure decrease the number of instructions needed to perform software-based page-table walk. For example, in particular embodiments a software-based page table walk for a 4-level page table may require approximately 70 instructions to perform, while embodiments disclosed herein require only approximately 20 instructions (5 instructions per level) to perform.

At step 105, the method of FIG. 1 includes accessing a virtual address from a request to access a memory of the computing device. For example, a request may come from an OS that needs to access a physical memory region for a process (e.g., application) executing on the computing device. This disclosure contemplates that accessing a request may include receiving that request. The example of FIG. 1 utilizes a multi-level page table to perform virtual-to-physical address translations. The multi-level page tables contains N levels. According to the nomenclature used here, the lowest level (e.g., $0^{th}$ level) of the multi-level page table contains the page-table entries that specify the physical address of a frame of physical memory, i.e., provide the final step in the translation of a virtual memory address to a physical memory address. The first, or top level, refers to the highest level in the page table, which contains entries mapping the most significant bits of the virtual address to the appropriate address of the next, lower level of the page table. While this disclosure describes the lowest level of the page table as providing the final step in the translation, other nomenclatures may refer to such level as the highest level in the page table, and the embodiments herein apply equal to such nomenclatures (but with the discussion of specific levels adjusted accordingly).

This disclosure contemplates that embodiments disclosed herein may be used with a variety of processor, memory management unit (MMU), and TLB architectures. One such architecture is the RISCV architecture. In the RISCV architecture, the rules for translating a mapped virtual address (VA) to a physical address (PA) are determined by walking the memory page tables to find the leaf (i.e., lowest level) page table entry (PTE) for the virtual address being translated. The leaf PTE value encodes the PA and access permissions for the translated address. Once any PTE in the table walk has been read, the RISCV translation rules defined by that PTE can be cached and reused without reloading the page tables from memory, until they are invalidated by an appropriate instruction or discarded in favor of more recently accessed translations.

At step 110, the method of FIG. 1 includes searching, using the virtual address, a translation lookaside buffer (TLB) comprising a plurality of TLB entries, where each TLB entry includes (1) a tag identifying a virtual address associated with the entry and (2) a page-table entry specifying the physical address of a lower-level page table or of a frame of physical memory associated with the virtual address identified in the tag. In other words, the TLB entries consist of a tag, which contains the information necessary to determine whether a future lookup matches the TLB entry, and data, which contains the information necessary to determine the translation rules once a match is found.

The TLB data is essentially the PTE value, which in particular embodiments is stored in encoded form to remove redundant bits. For example, when caching a PTE the TLB may store some or all of the following cached information to determine the physical address and the access permissions. The cached information can include the PPN (Physical Page Number), which is the physical address excluding the lower bits. Particular embodiments can compress the PPN by or'ing any upper bits beyond the number of physical address bits supported by the core into a single bit, since if any of these bits is set, then accessing the page will generate an access fault. Cached information can include N (NAPOT), which indicates that the address is part of a 64 KB page; R (Read), which indicates that the page is readable; W (Write), which indicates that the page is writable; X (eXecute), which indicates that the page is executable; U (User), which indicates that this is a user mode page; G (Global), which indicates that this is a global page (a G bit should be set if any of the higher level non-leaf PTEs in the table walk had their G bit set); and D (Dirty), which indicates that the page is dirty. In particular embodiments, the cached information also contains V, A and reserved bitfields, such as in the PTE. Particular embodiments recode the information from those bits into the R, W and X bits, using a reserved R/W/X encoding, to identify non-leaf pages and to generate page faults.

In particular embodiments, a TLB tag contains information about the level in the page table from which the PTE was read, which determines the size of the page being cached. In particular embodiments, a TLB tag contains information about the VPN (Virtual Page Number), which is the integer part of the virtual address of the page being mapped divided by the page size. All virtual addresses with the same VPN can be mapped via this page provided the other match criteria are met. In particular embodiments, a TLB tag contains information about the ASID, such as the satp.ASID value for which the translation was generated, which specifies the process that the TLB entry (e.g., page table) applies to, as each process may have an associated page table.

At step 115, the example method of FIG. 1 includes iteratively performing, until the virtual address is translated to a physical address, an address-translation procedure that includes steps 120, 122, 124, and 126, which are explained in more detail below. As explained more fully herein, the address-translation procedure caches both leaf and non-leaf PTEs in the TLB. On lookup, the method of FIG. 1 picks the lowest level (i.e. smallest page size) TLB entry for which the tag matches the content of the virtual address being translated. This ensures that the walk starts as far through the multi-level page table as possible, given the previous recent memory accesses, reducing the time and computational resources spent on performing a memory translation. In addition, particular embodiments of this disclosure require only one general purpose register and therefore have minimal save/restore overhead.

Figure 2:
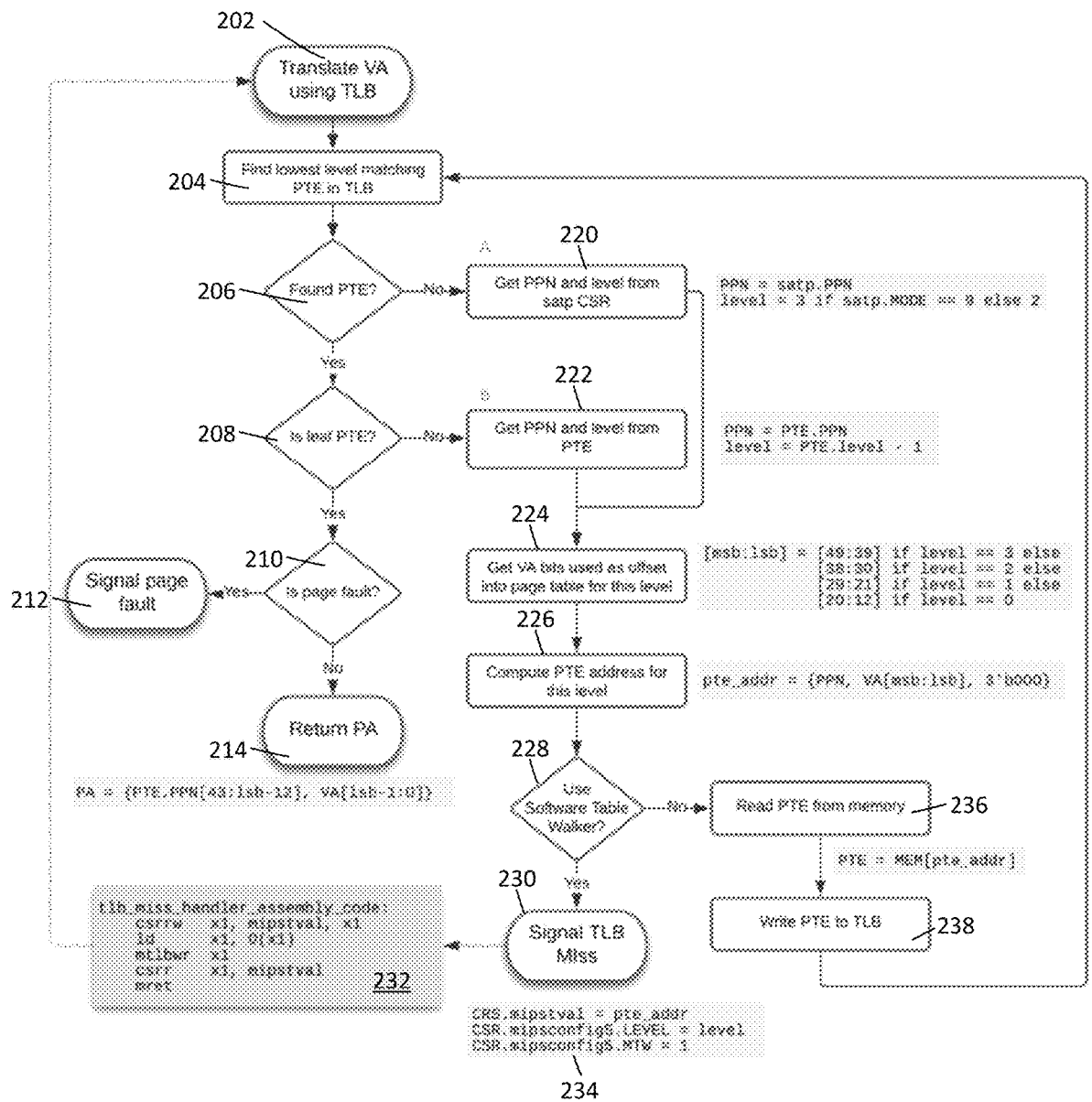
FIG. 2 illustrates an example approach implementing the method of FIG. 1.

FIG. 2 illustrates an example approach providing an example implementation of the method of FIG. 1 using the RISCV architecture for a 4-level page table, and as explained below, the example of FIG. 2 illustrates how either a hardware or a software table walk can be implemented in conjunction with simultaneously caching both leaf and non-leaf PTEs in the TLB. In particular embodiments, for both the hardware and software table walk, when no leaf PTE is found in the TLB, the hardware computes the address of the next level of the table walk, using information from the matching non-leaf PTE if present or from the satp CSR otherwise. Both FIG. 2 and the disclosure below also describe how embodiments proceed when encountering situations in which the address cannot be translated using a table walk, e.g., if a page fault occurs.

As shown in step 202 of FIG. 2, after a virtual address is received the system may access the TLB to attempt to translate the virtual address to a physical address. In step 204, and as illustrated in FIG. 1 in step 120, the system searches the TLB (e.g., using the TLB tags and virtual address) to determine what (if any) is the lowest matching level in the page table that is cached in the TLB, i.e., if the virtual address from the request is associated with at least one TLB entry, then the system finds the TLB entry associated with the virtual address that is furthest into the multi-level page table, which may be a leaf level or non-leaf level.

The system determines whether a match in the TLB is found, for example at step 206 of the approach shown in FIG. 2. If a match is found, the system at step 208 determines whether the TLB entry identifies a leaf, or lowest level, PTE that identifies the physical address corresponding to the virtual address. If yes, as explained for example in step 122 of the example of FIG. 1, then in response to a determination that the associated TLB entry identifies a page-table entry from the lowest level of the multi-level page table specifying the physical address of a frame of physical memory, step 122 includes using that page-table entry to translate the virtual address. This is shown in FIG. 2 as step 214, in which the physical address corresponding to the virtual address is returned. As shown in FIG. 2, a translation procedure may include determining whether a page fault occurs, such as in step 210, and if so, then signaling a page fault to the system as in step 212.

Step 124 in the example of FIG. 1 includes in response to a determination that the associated TLB entry identifies a page-table entry from a level that is higher than the lowest level, then: (1) using the TLB entry to determine the address of the next level of the page table associated with the virtual address, and (2) updating the TLB to include a TLB entry identifying the address of the next level of the page table associated with the virtual address translation. FIG. 2 illustrates an example of this procedure. At step 208, if the PTE is not a leaf PTE (i.e., the lowest-level matching PTE in the TLB associated with the virtual address being translated is not at the lowest level of the multi-level page table), then at step 222 the system may get the PPN (physical page number) and the corresponding level in the page table from the TLB entry. At step 224, the system obtains the virtual address bits (i.e., the portion of the virtual address) corresponding to the offset for that level of the page table. The system uses the level identified in step 222, and using the offset identified in the virtual address, computes the PTE address for that level. As explained above, this PTE address identifies either the physical address of the next level of the page table or the physical address of the frame of memory corresponding to the virtual address.

At step 228, the system determines whether to use the software table walker, and if not, then hardware performs step 236, which reads the computed PTE from memory and step 238, which writes the PTE to the TLB. Thus, subsequent translations that correspond to the PTE at this level of the page table can access that level's translation directly from the TLB, even if those subsequent translations use a different offset than the virtual address that caused the write to TLB in step 238. After step 238, the system repeats step 204, and the procedure continues as described above.

If at step 228 the software table walker is used, then at step 230 a TLB miss is signaled. In particular embodiments, a software table walker transparently emulates a hardware table walk, and can be enabled or disabled if a hardware table walker is also implemented. When no leaf PTE is found in the TLB and the software table walker is active, hardware writes the next PTE address to the mipstval CSR, for example as shown in output 234 of FIG. 2 by "CSR.mipstval=pte_addr," and signals a TLB miss exception. As explained above, this pre-computation by the hardware reduces the number of instructions required by the software walker, and this pre-computation may be performed even when a hardware table walk is not available on the computing device (e.g., the necessary hardware to perform a hardware table walk is not present). In addition, as shown in example assembly code 232 of FIG. 2, the software table walk can execute the same operations for each level of the table walk, i.e., the instructions executed are not dependent on the level of the table at which the walk occurs.

Next, the TLB miss handler assembly code, such as example code 232 shown in FIG. 2, reads the PTE address from the mipstval CSR, loads the PTE value from memory, writes that value to the TLB using the "mtlbwr" instruction, and does "mret" to re-execute the original memory access instruction (e.g., return to step 202 in the procedure of FIG. 2). After the mret, the address translation process will repeat, each time generating a TLB miss with CSR.mipstval set to the address of the next level table entry in the table walk. Finally, the leaf PTE is written to the TLB, allowing the original memory access instruction to complete (e.g., step 214 occurs and the physical address corresponding to the virtual address is returned).

As illustrated in output 234, embodiments of this disclosure introduce three new registers that enable the software table walk described herein, which are described in connection with a RISCV architecture. CSR.mipstval specifies the value of the PTE address for the level being translated, which may be implemented as, e.g., a context register associated with the CPU. CSR.mipsconfig5.LEVEL identifies the specific level in the multi-level table that the PTE in CSR.mipstval corresponds to. CSR.mipsconfig5.MTW is a bit that enables or disables the software table walker capability, as described more fully herein. Likewise, embodiments of this disclosure utilize a new instruction set, illustrated in code 232 of FIG. 2, that defines a software table walk. This instruction set includes a new instruction, mtlbwr, which is a custom instruction that writes the appropriate entry (e.g., the PTE and associated tag information) into the TLB at a random location.

As illustrated in FIG. 2, one of the instructions in code 232 used by a software table walker is a load (1d) instruction, and in some architectures (such as the RISCV architecture) the behavior of a memory load during a hardware table walk is different that a load carried out by normal software. Therefore, particular embodiments provide a software table walk mode that can carry out PTE loads with the same privileges and translations rules as a hardware table walker, for example using the mipsconfig5.MTW bit illustrated in FIG. 2. When set, this bit causes loads to act with the privileges and translations rules that a PTE load by the hardware table walker would use. In particular embodiments, the bit may be automatically set to 1, i.e., enabled, when a TLB miss exception occurs. The bit can be set or cleared, as needed, with, e.g., a csrw instruction. In particular embodiments, the mipsconfig5.MTW bit may be automatically cleared by mret (as shown in code 232 of FIG. 2) or when an exception other than a TLB miss occurs, meaning that software table walk mode is automatically turned off on exit from the TLB miss handler.

In particular embodiments, a TLB miss exception, such as TLB miss 230 of FIG. 2, may perform state updates that occur when translation of a virtual address is attempted and there is no matching leaf PTE in the TLB. For example, the mcause CSR may updated to a specific value that shows that a TLB miss has occurred, as well as the type of TLB miss that occurred. As another example, CSR.mipstval may be set to the address of the next PTE in the table walk (i.e., to pte_addr as shown in output 234), which may be computed based in part on the on the PPN, which may be read from either a matching non-leaf TLB entry, if present, or from an appropriate address and translation register value (e.g., satp.PPN). The level, such as the value in CSR.mipsconfig5.LEVEL, may be set to level-1 of the matching non-leaf TLB entry, if present, or may be set to the start level of the table walk for the current satp.MODE, otherwise. This field may be used to determine the target level of a subsequent MTLBWR instruction in the software table walk.

Step 126 in the example of FIG. 1 includes in response to a determination that the associated TLB entry identifies a page-table entry from a level that is higher than the lowest level, then (1) performing a page-table walk through each level of the multi-level page table to translate the virtual address, and (2) at each level of the page-table walk, updating the TLB to include a TLB entry identifying the address of each level of the page table associated with the virtual address translation. For example, as shown in FIG. 2, if no PTE is found in the TLB in step 206 then the PPN and the level may be obtained from the satp control/status register (CSR). The flow then skips to step 224, as described above, walking through each level of the page table and creating a TLB entry storing the PTE at each level of the page table until the virtual address is translated.

The following pseudocode illustrates an example implementation following the procedure shown in the example of FIG. 2:

```
while 1:
    pte = lowest_level_matching_pte_in_tlb(va)
    if pte is None: # TLB miss: start table walk at root of page table.
        PPN = CSR.satp.PPN # Read base PPN of page table from
        satp CSR
        level = 3 if CSR.satp.MODE == 9 else 2 # Get start level of
        table walk
    elif is_leaf(pte): # Leaf PTE found in TLB, use it to translate
    the VA.
        break
    else: # Non-leaf PTE found, use it to find address of next level
    PTE.
        PPN = pte.PPN
        level = pte.level - 1
    msb, lsb = vpn_range[level]
    addr = {PPN, VA[msb:lsb], 0b000}
    pte = MEM[addr]
    tlb_write(pte, level) # Cache PTE in the TLB
check_page_fault(pte)
pa = {pte.PPN[43:lsb-12], VA[lsb-1:0]}
```

As explained above, and as illustrated in code 232 of FIG. 2, the instructions necessary to perform a table walk are reduced to 5 instructions per level of the walk, well below what would typically be required. In addition, because address translations typically will not require traversing every level of the page table once a particular level has been traversed for a process, the procedures described above reduce the number of levels necessary to traverse during a table walk and therefore reduce the time and computational resources spent on memory lookups when performing a table walk.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device described herein, by a processor coupled to non-transitory computer readable storage media, or any suitable combination thereof.

Figure 3:
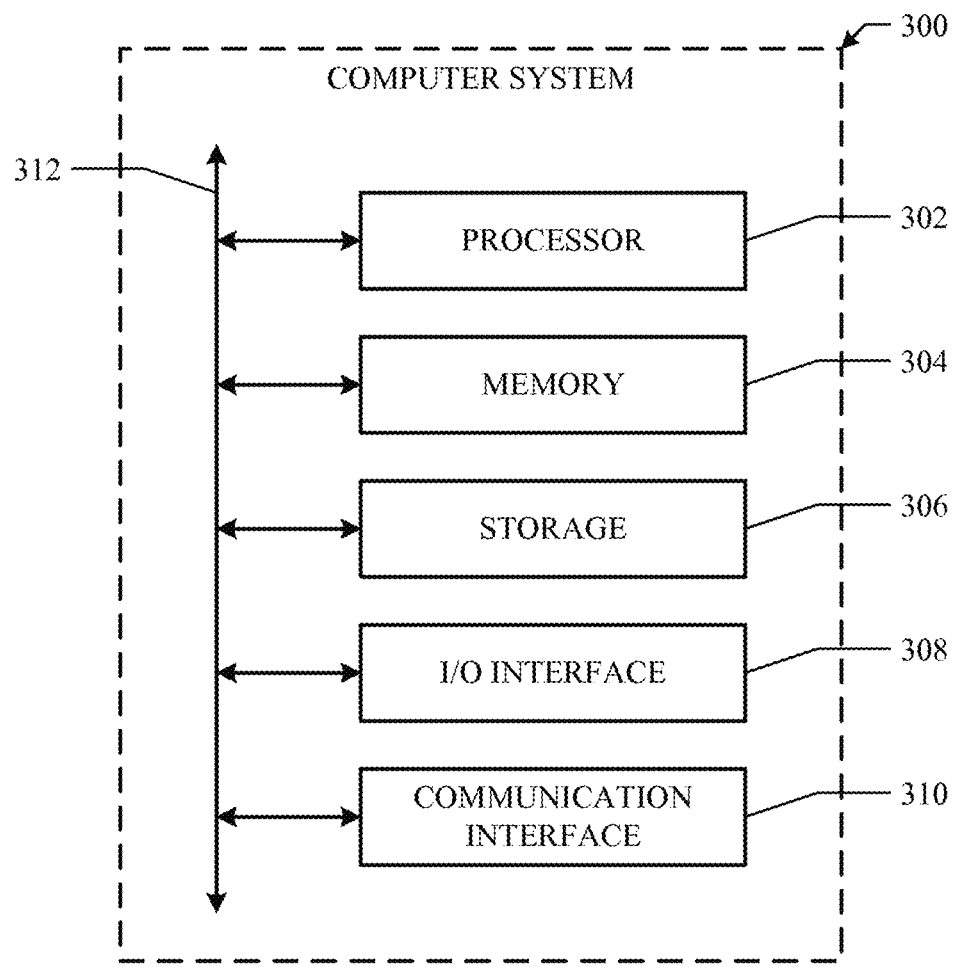
FIG. 3 illustrates an example computing device.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

The invention claimed is:

1. A system comprising:
one or more processors and a non-transitory computer readable storage media embodying software instructions coupled to the one or more processors, the one or more processors operable to execute the software instructions to:
access a virtual address from a request to access a memory of a computing device, wherein virtual addresses are translated to physical addresses of physical memory in the computing device using a multi-level page table comprising N levels, and wherein the lowest level of the multi-level page table contains a plurality of page-table entries specifying the physical address of a frame of physical memory;
search, using the virtual address, a translation lookaside buffer (TLB) comprising a plurality of TLB entries, each TLB entry comprising (1) a tag identifying a virtual address associated with the entry and (2) a page-table entry specifying the physical address of a lower-level page table or of a frame of physical memory associated with the virtual address identified in the tag; and
iteratively perform, until the virtual address is translated to a physical address, an address-translation procedure comprising:
in response to a determination that the virtual address from the request is associated with at least one TLB entry, then finding the TLB entry associated with the virtual address that is furthest into the multi-level page table, and:
in response to a determination that the associated TLB entry identifies a page-table entry from the lowest level of the multi-level page table specifying the physical address of a frame of physical memory, then using that page-table entry to translate the virtual address;
in response to a determination that the associated TLB entry identifies a page-table entry from a level that is higher than the lowest level, then: updating, using a number of executable instructions, the TLB to include directly within the TLB a new TLB entry identifying the address of the next level of the page table associated with the virtual address, wherein the number of executable instructions is the same for each level of the multi-level page table;
in response to a determination that the virtual address from the request is not associated with any TLB entry, then:
performing a page-table walk through each level of the multi-level page table to translate the virtual address; and
at each level of the page-table walk, updating the TLB to include directly within the TLB a new TLB entry identifying the address of each level of the page table associated with the virtual address translation; and
hardware within the computing device operable to:
compute the address of the next level of the page table associated with the virtual address; and
store the computed address of the next level of the page table in a register of the computing device.

2. The system of claim 1, wherein the software can be enabled or disabled by a setting a bit associated with a software table walker.

3. The system of claim 1, wherein each TLB entry further comprises an identification of the level in the multi-level page table associated with the page-table entry of that TLB entry.

4. The system of claim 1, wherein each TLB entry further comprises a virtual page number identifying the particular page table in which the page-table entry associated with that TLB entry appears.

5. The system of claim 1, wherein each TLB entry further comprises an identification of the process associated with the TLB entry.

6. A method comprising, by a computing device:
accessing a virtual address from a request to access a memory of the computing device, wherein virtual addresses are translated to physical addresses of physical memory in the computing device using a multi-level page table comprising N levels, and wherein the lowest level of the multi-level page table contains a plurality of page-table entries specifying the physical address of a frame of physical memory;

searching, using the virtual address, a translation lookaside buffer (TLB) comprising a plurality of TLB entries, each TLB entry comprising (1) a tag identifying a virtual address associated with the entry and (2) a page-table entry specifying the physical address of a lower-level page table or of a frame of physical memory associated with the virtual address identified in the tag; and iteratively performing, until the virtual address is translated to a physical address, an address-translation procedure comprising:
- in response to a determination that the virtual address from the request is associated with at least one TLB entry, then finding the TLB entry associated with the virtual address that is furthest into the multi-level page table, and:
  - in response to a determination that the associated TLB entry identifies a page-table entry from the lowest level of the multi-level page table specifying the physical address of a frame of physical memory, then using that page-table entry to translate the virtual address;
  - in response to a determination that the associated TLB entry identifies a page-table entry from a level that is higher than the lowest level, then:
    - using the TLB entry to compute, using hardware of the computing device, the address of the next level of the page table associated with the virtual address;
    - storing the computed address of the next level of the page table in a register of the computing device; and
    - updating, by software comprising a number of executable instructions, the TLB to include directly within the TLB a new TLB entry identifying the address of the next level of the page table associated with the virtual address, wherein the number of executable instructions is the same for each level of the multi-level page table;
- in response to a determination that the virtual address from the request is not associated with any TLB entry, then:
  - performing a page-table walk through each level of the multi-level page table to translate the virtual address; and
  - at each level of the page-table walk, updating the TLB to include directly within the TLB a new TLB entry identifying the address of each level of the page table associated with the virtual address translation.

7. The method of claim 6, wherein the software can be enabled or disabled by a setting a bit associated with a software table walker.

8. The method of claim 6, wherein each TLB entry further comprises an identification of the level in the multi-level page table associated with the page-table entry of that TLB entry.

9. The method of claim 6, wherein each TLB entry further comprises a virtual page number identifying the particular page table in which the page-table entry associated with that TLB entry appears.

10. The method of claim 6, wherein each TLB entry further comprises an identification of the process associated with the TLB entry.

* * * * *